United States Patent
Nakama et al.

(10) Patent No.: US 6,987,906 B2
(45) Date of Patent: Jan. 17, 2006

(54) OPTICAL CONNECTION DEVICE

(75) Inventors: Kenichi Nakama, Osaka (JP); Yukinari Sekiguchi, Osaka (JP); Osamu Mikami, Kanagawa (JP); Yoshikazu Murata, Kanagawa (JP); Kentarou Miyazato, Kanagawa (JP)

(73) Assignees: Nippon Sheet Glass Co., Ltd., Osaka (JP); Tokai University Educational System, Tokyo (JP)

( * ) Notice: Subject to any disclaimer, the term of this patent is extended or adjusted under 35 U.S.C. 154(b) by 0 days.

(21) Appl. No.: 10/648,783

(22) Filed: Aug. 27, 2003

(65) Prior Publication Data

US 2004/0096152 A1 May 20, 2004

(30) Foreign Application Priority Data

Aug. 27, 2002 (JP) ............................. 2002-247129

(51) Int. Cl.
*G02B 6/26* (2006.01)

(52) U.S. Cl. ......................................... 385/31; 385/15

(58) Field of Classification Search ................ 385/31, 385/32, 36, 15
See application file for complete search history.

(56) References Cited

U.S. PATENT DOCUMENTS

| 6,370,292 B1 * | 4/2002 | Strake .......................... 385/14 |
| 6,542,672 B2 * | 4/2003 | Jewell et al. .................. 385/49 |
| 2004/0052463 A1 * | 3/2004 | Chen ............................ 385/48 |

FOREIGN PATENT DOCUMENTS

JP 07-086555 3/1995

OTHER PUBLICATIONS

Article from the Optical Society of Japan; Proceedings of Optics Japan 2001 Experiment on Insertion of Optical Pin to Hole for Optical Surface Mount Technology; K. Suzuki et al.

* cited by examiner

*Primary Examiner*—Jennifer Doan
(74) *Attorney, Agent, or Firm*—Whitham, Curtis & Christofferson, PC

(57) ABSTRACT

An optical connection device according to the invention is an optical connection device for optically coupling light propagated through an optical waveguide to an optical element arranged outside the optical waveguide and with the following configuration. Part of the optical waveguide is removed so as to be shaped like a groove. The optical waveguide and the optical element are arranged so that an optical axis of the optical waveguide intersects an optical axis of the optical element at a specified angle inside the groove. An optical unit is arranged at a position of intersection of the optical axes for turning light by reflection from one optical axis along the other optical axis.

23 Claims, 3 Drawing Sheets

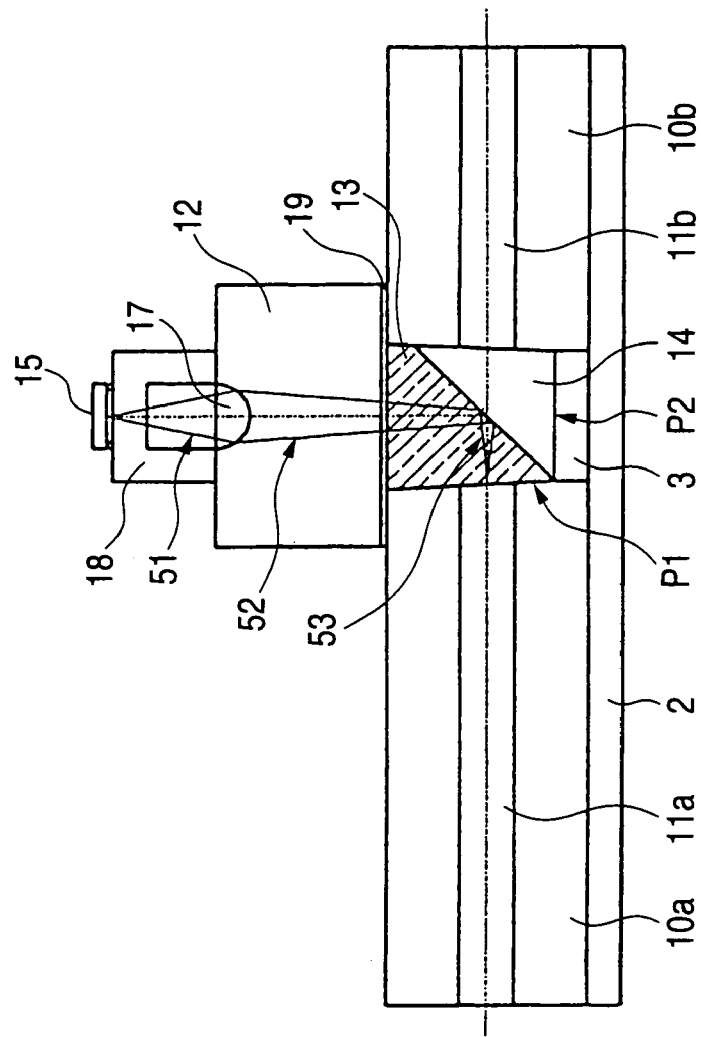
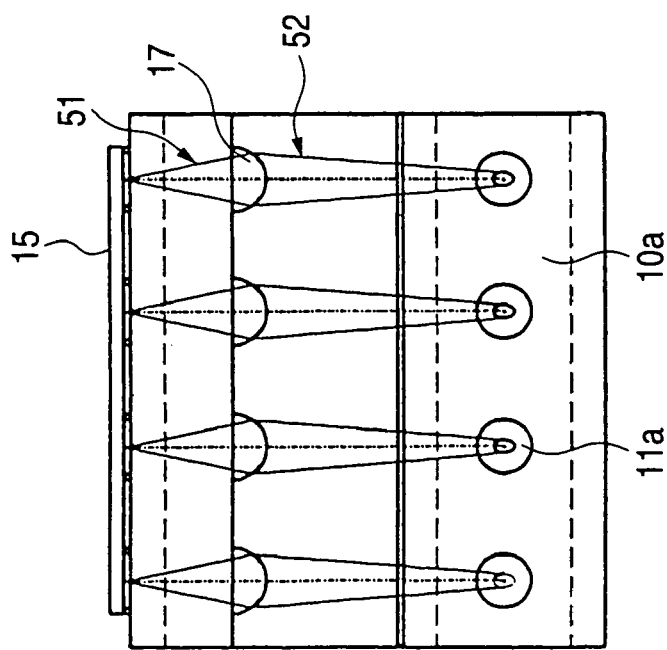

OPTICAL CONNECTION DEVICE

The present application is based on Japanese Patent Application No. 2002-247129, the entire contents of which are incorporated herein by reference.

BACKGROUND OF THE INVENTION

1. Field of the Invention

The present invention relates to an optical connection device used in the field of optical communications and particularly relates to an optical connection device which can be integrated for optically coupling light beams propagated through optical waveguides to optical elements respectively.

2. Related Art

The quantity of information processed by an information processor such as a computer has been increasing steadily. In conjunction with this tendency, the number of wiring circuits inside or between electronic circuit boards used for forming the information processor has increased, and higher-density mounting of electronic circuits is required. However, problems such as interference of signals between wiring circuits and propagation delay caused by increase in wiring distance are growing more serious.

Public attention has been paid to optical connection technology as a means for solving these problems. The optical connection technology is suited to transmission or a large quantity of information because parallel mounting can be made without the problem of mutual interference in transmission of optical signals. Wiring circuits inside each electronic circuit board can be replaced by so-called optical circuits that transmit optical signals from light sources (light-emitting elements) mounted on the board to photo detectors (photodetecting elements) through optical transmission units such as optical waveguides.

The electronic circuits are however different from the optical circuits at a lot of points. In the optical circuits, it is necessary to connect optical elements and transmission paths such as optical waveguides to one another. Optical coupling, however, needs precise positioning (alignment) and is not easy compared with electric connection that can be effectuated by simple contact. Generally, in order to connect electronic devices to printed wiring circuits on an electronic circuit board, pins of the electronic devices are inserted into the printed wiring board and soldered to the printed wiring board. It would also be desirable that optical connection can be made by a simple method such as an inserting and fixing method as described above. Such a simple optical connection unit is now named "optical pin" for the pins of the electronic devices.

For example, there is known an optical pin that conducts optical connection by inserting an optical fiber into a hole that pierces an optical waveguide (see Proceedings of Optics Japan 2001, 6pD1). That is, an optical waveguide is formed in a board, and a through-hole is provided in the board so as to pierce the optical waveguide. A gradient index optical fiber having a tip processed so as to be inclined at an angle of 45° is inserted into the through-hole so that light propagated through the optical waveguide can be turned by 90°. The optical pin is configured so that the turned light is connected to an optoelectronic integrated circuit outside the optical waveguide by the lens function of the gradient index optical fiber As disclosed in JP-A-7-86555, there is known a method in which photoactive elements such as semiconductor lasers or photodiodes, microlenses and prismatic V-grooves are used for propagating light in a free space by multiple reflection to thereby achieve an optoelectronic integrated circuit.

The diameter of the optical pin is however very small to be 127 $\mu$m because a gradient index optical fiber is used as the optical pin. For this reason, there is the drawback that the optical pin is easily broken, and that it is difficult to handle the optical pin during assembly. Meanwhile, since it is impossible to take the pin interval smaller than 250 $\mu$m, there is also a problem that such optical pins are unsuitable for integration.

In addition, tolerance in the processing position of each portion that combines with the optical waveguide is too strict to obtain good performance. In an optical sense, there is a problem that coupling characteristic deteriorates because astigmatic difference is produced in the horizontal direction of the optical waveguide by the lens function of the optical fiber after the optical path is turned.

Thus, the design of a light-condensing system of optical pins using optical fibers is limited variously.

On the other hand, in the case where light is propagated by multiple reflection in prisms, the dimensional tolerance of the prisms becomes strict because the profile accuracy of each prism surface exerts influence on the dimensional tolerance multistageously. It is also difficult to mount the prisms on an optoelectronic hybrid circuit board premised that the board is connected to optical fibers, because all optical systems provided are closed with optical path-turning systems respectively.

SUMMARY OF THE INVENTION

The invention is developed while paying attention to the problems in the related art and an object of the invention is to provide an optical connection device which uses an array of microlenses so that optical elements such as semiconductor lasers or photodiodes can be easily mounted on an opto-electronic hybrid circuit board having optical waveguides or optical fibers.

The optical connection device according to the invention is an optical connection device for optically coupling light propagated through an optical waveguide to an optical element disposed outside the optical waveguide and with the following configuration. The optical waveguide is formed in a flat board so that an optical axis of the optical waveguide is parallel to a surface of the board. Part of the optical waveguide is removed along a plane angled at predetermined angle to the optical axis of the optical waveguide so as to be shaped like a groove. The optical waveguide and the optical element are arranged so that the optical axis of the optical waveguide intersects an optical axis of the optical element at a specified angle inside the groove. An optical unit is arranged at a position of intersection of the optical axes for turning light by reflection from one optical axis along the other optical axis.

According to this configuration, the optical connection device or this invention can integrate various types of optical elements and electronic devices with a board having optical waveguides formed therein and can compactly mount these devices on the board.

Preferably, the optical element is mounted on a surface which is at a predetermined distance from the board surface and parallel with the board surface. In this manner, when the optical connection device is to be assembled, the optical element can be moved in parallel with the optical axis or the optical waveguide so that alignment work can be simplified.

The optical element may be a light-emitting element such as a semiconductor laser or particularly a surface emission laser. Also, it may be a photodetecting element such as a photodiode. On the other hand, the optical unit for turning light by reflection may be preferably either of a prism and a mirror. Preferably, a light-condensing unit as represented by a lens may be interposed between the optical element and the optical unit for turning light by reflection.

When these optical members are mounted in combination, either an optical connection device for detecting an optical signal propagated through the optical waveguide or an optical connection device for delivering an optical signal to the optical waveguide, or a combination of these optical connection devices can be integrated and compactly mounted.

Further, the invention can be also applied to an optical connection device configured as follows. That is, the optical connection device is an optical connection device for inputting an optical signal propagated through a first optical waveguide into a photodetecting element disposed outside the optical waveguide, converting the optical signal into an electric signal, applying predetermined transformation to the electric signal, driving a light-emitting element by the electric signal and coupling light emitted from the light-emitting element as an optical signal to a second optical waveguide. The first and second optical waveguides are formed in a flat board so that optical axes of the first and second optical waveguides are parallel to a surface of the board in the same manner as described above. The first and second optical waveguides have end surfaces exposed to a common groove portion and angled at a predetermined angle to the optical axes of the first and second optical waveguides respectively. An optical unit is disposed in the groove portion for turning light output from the first optical waveguide to input the light into the photodetecting element and for turning light emitted from the light-emitting element to input the light into the second optical waveguide.

With this configuration, an optical connection device having a function for once converting a transmitted optical signal into an electric signal, applying some electric transformation to the electric signal and then restoring the electric signal into an optical signal again in order to transmit the optical signal continuously can be integrally and compactly mounted on a board.

Also in this case, preferably, the photodetecting element and the light-emitting element are mounted on a surface which is parallel with the board surface at a predetermined distance apart. In this manner, when the optical connection device is to be assembled, the optical element can be moved in parallel with the optical axis of the optical waveguide so that alignment work can be simplified.

Preferably, the turning optical unit may be a polymorphic prism. When the polymorphic prism is used, light can be turned along a plurality of optical paths by a single device.

Preferably, a light-condensing unit represented by a lens may be interposed at least between the light-emitting element and the optical unit. Light emitted from the light-emitting element is generally divergent light. When the light-condensing unit is used, the light can be efficiently coupled to the optical waveguide. There are some cases where light output from the optical waveguide can be detected even when the light-condensing unit is not necessarily used between the photodetecting element and the optical unit.

BRIEF DESCRIPTION OF THE DRAWINGS

FIGS. 1A and 1B are typical views showing a first embodiment of an optical connection device according to the invention;

DETAILED DESCRIPTION OF THE PREFERRED EMBODIMENTS

Figure 2:
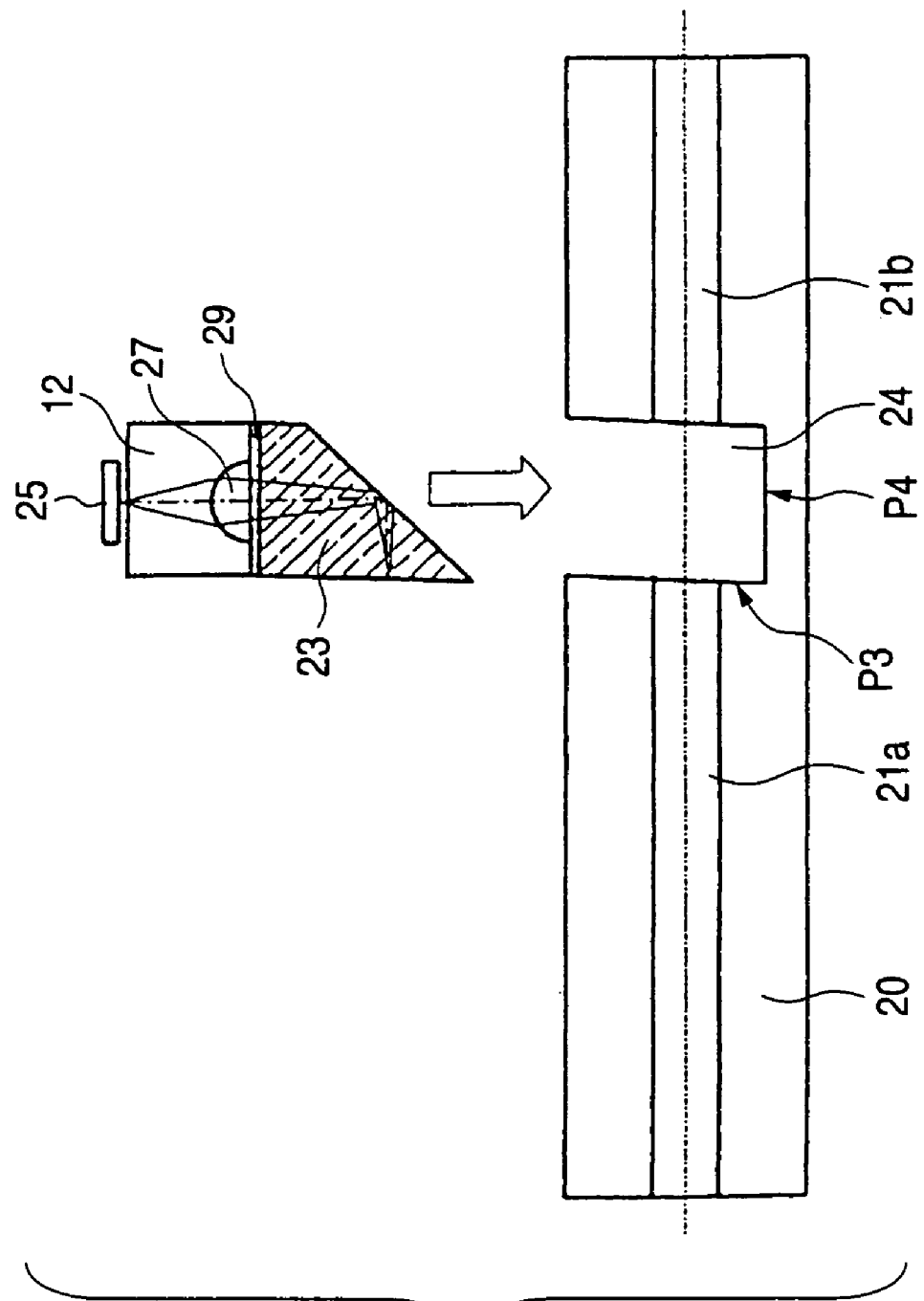
FIG. 2 is a typical view showing a second embodiment of the optical connection device according to the invention.

Embodiments of the invention will be described below by way of specific example.

[Embodiment 1]

FIGS. 1A and 1B are views typically showing a first embodiment of an optical connection device according to the invention. A subject of this embodiment is an optical connection device for optically coupling light beams emitted from light-emitting elements such as a surface emission laser array 15 to an optical waveguide array 11a through a light-condensing unit such as a microlens array 17. FIG. 1A is a sectional view taken in a direction perpendicular to optical axes of the optical waveguides. FIG. 1B is a sectional view taken in a direction parallel to the optical axes.

As shown in FIG. 1A, the surface emission laser array 15 has a plurality of surface emission laser devices arranged in a row on a substrate at regular intervals of a pitch equal to the pitch of arrangement of optical waveguides in the optical waveguide array which will be described later. Although four devices are shown in FIG. 1A, the number of devices is not limited. Even a single device not an array may be used. The surface emission laser array 15 is fixed onto a spacer 18 provided with pinholes (not illustrated). The distance between the surface emission laser array 15 and the microlens array 17 is determined on the basis of the thickness of the spacer 18. In this embodiment, the distance is set at 0.5 mm. The microlens array 17, which has microlenses each having a diameter of 170 $\mu$m and a focal length of 420 $\mu$m, is produced on a surface of a 1.6 mm-thick glass substrate by an ion exchange method.

The microlens array 17 and the surface emission laser array 15 are aligned while condensed light spots are observed so that optical axes of the two arrays are made coincident with each other in a state where the surface emission lasers are operated. In this condition, the microlens substrate 12 and the spacer 18 are stuck and fixed to each other The resulting unit integrated in this way is hereinafter referred to as "light source unit".

On the other hand, two opto-electronic hybrid circuit boards 10a and 10b are stuck on a backing board 2 with interposition of a spacer 3 between the boards 10a and 10b. The term "opto-electronic hybrid circuit boards" used herein means a board on which constituent members for forming optical circuits such as optical waveguides, light-emitting elements, photodetecting elements, etc. and electronic circuits for modulating and driving the light-emitting elements by electric signals and for amplifying electric signals detected and converted by the photodetecting elements are mounted mixedly.

In the opto-electronic hybrid circuit board 10a, optical waveguides equal in number to devices in the surface emission laser array 15 are embedded in parallel to one another to thereby form an optical waveguide array 11a. The optical waveguide array 11a is produced as follows. Grooves each having a predetermined width and a predetermined depth are provided in a surface of the board 10a. Optical fibers having outer circumferential portions etched so that the diameter of each of the optical fibers is reduced to about 50 μm are put in the grooves respectively and fixed into the board 10a by a resin to thereby produce the optical waveguide array 11a. The embedded depth is set at 1 mm. The method for producing optical waveguides is not limited to the aforementioned method. Any method may be used if a core/clad structure can be produced in the board.

A groove (micro-slit) 14 is formed between the two opto-electronic hybrid circuit boards 10a and 10b by the spacer 3. End surfaces of the opto-electronic hybrid circuit boards 10a and 10b on which optical waveguide arrays 11a and 11b are exposed to the micro-slit 14 are cut and polished so as to be inclined at a predetermined angle to the optical axes of the optical waveguide arrays 11a and 11b.

The reason why the end surfaces of the optical waveguides are provided as inclined surfaces is that reflected light beams in the end surfaces of the optical waveguides are prevented from making the operations of the lasers unstable by returning to the surface emission laser array 15 and being input into active regions of the lasers that emitted the light beams. The inclination angle is selected to be in a range of from about 2° to about 8° with respect to a plane perpendicular to the optical axes of the optical waveguides. Although the directions of inclination of the end surfaces of the two opto-electronic hybrid circuit boards 10a and 10b may be parallel to each others the directions may be also decided so that the width of the groove is widened toward the top as shown in FIG. 1B to make it easy to insert the light source unit.

Portions of the end surfaces of the opto-electronic hybrid circuit boards 10a and 10b having contact with the spacer 3 are processed so as to be perpendicular to the optical axes of the optical waveguide arrays 11a and 11b. Therefore, the distance between the end surfaces of the optical waveguide arrays 11a and 11b exposed to the micro-slit 14 is regulated. Here, the distance is set at 2 mm.

In this embodiment, a microprism 13 with a width of 4 mm and a height of 2.2 mm is used as an optical unit for turning light beams emitted from the surface emission laser array 15. The microprism 13 is inserted into the micro-slit 14. At that time, while one end surface of the microprism 13 is pressed against an end surface P1 of the opto-electronic hybrid circuit board 10a, the apex of the prism strikes against a surface P2 of the spacer 3 to thereby position and bond the microprism 13. Incidentally, it is necessary to form the prism so that its height is not higher than the depth of the micro-slit, and that the prism agrees with the shape of the micro-slit 14, that is, with the inclination angle of the end surfaces of the opto-electronic hybrid circuit boards 10a and 10b.

In this manner, there is formed an optical system in which light beams emitted from the surface emission laser array 15 are reflected by the inclined surface of the microprism 13 so as to be turned at a right angle and coupled to the optical waveguide array 11a.

The turning optical unit and the light source unit composed of the surface emission laser array 15, the spacer 18 and the microlens array 17 are aligned with each other as follows. While the surface emission lasers are operated in a state that the microlens substrate 12 is pressed against the opto-electronic hybrid circuit boards 10a and 10b so as to bridge across the groove portion between the opto-electronic hybrid circuit boards 10a and 10b, the microlens substrate 12 is moved relative to the opto-electronic hybrid circuit boards 10a and 10b. The intensity of light output from the other end of the optical waveguide array 11a is monitored, so that the positional relation between the microlens substrate 12 and the opto-electronic hybrid circuit board 10a is decided when the monitored intensity of light is maximized. After the decision or the optimal positions, the microlens substrate 12, the opto-electronic hybrid circuit boards 10a and 10b and the microprism 13 are fixed by a UV-curable adhesive agent used as a bonding material 19.

The optical system configured in the above manner functions as an optical connection device in which: divergent pencils of light beams 51 emitted from the surface emission laser array 15 are converted into convergent pencils of light beams 52 by the microlens array 17; the convergent pencils of light beams 52 are reflected by the microprism 13 so as to be converted into turned pencils of light beams 53; and the turned pencils of light beams 53 are condensed at the end surface of the optical waveguide array 11a.

The optical connection device for optically coupling light beams emitted from the surface emission laser array 15 to the optical waveguide array 11a in the opto-electronic hybrid circuit board 10a has been described above. In the case where the function of the optical connection device can be limited to coupling of light beams emitted from the light-emitting elements to the optical waveguides as described above, it is unnecessary to form any optical waveguide in the opto-electronic hybrid circuit board 10b. However, in the case where it is necessary to provide a function for merging new optical signals emitted from light sources with optical signals propagated through the optical waveguides in the middle of the optical waveguides, an optical waveguide array 11b having the same depth and pitch as the optical waveguide array 11a is also formed in the opto-electronic hybrid circuit board 10b so that light beams transmitted through the microprism 13 and the micro-slit 14 can be propagated between the optical waveguide arrays 11a and 11b. Incidentally, the microprism may be replaced by a micromirror having reflectance and transmittance which are set according to necessity.

Although surface emission lasers easy to form an array and narrow in spread of light emitted therefrom are preferably used as the light-emitting elements, the light-emitting elements are not limited thereto. In a broad sense, light beams output from the optical waveguides may be used as light sources.

Photodetecting elements such as a photo diode array may be disposed instead of the light-emitting elements. In this case, light beams output from the optical waveguide array 11a are turned by the microprism 13 and input into the photodiode array so that the light beams can be detected. The optical system in this case is referred to as "photo detector unit" as against the light source unit.

In the photo detector unit, there are some cases where the light-condensing unit may be dispensed with because a photodetecting surface of each photodetecting element has a certain amount of area. While light from the optical waveguide side is input into the photo detector unit, the position of the photo detector unit is adjusted so that the output from the photodiodes is maximized.

Also in the configuration using the photo detector unit, all light beams output from the optical waveguide array 11a may be reflected by the microprism 13. Or part of the light beams may be reflected by the microprism 13 so that the other part of the light beams can be transmitted through the microprism 13 so as to be coupled to the optical waveguide array 11b.

Although the embodiment has been described on the case where the distance between the end surfaces of the two opto-electronic hybrid circuit boards 10a and 10b is regulated by the spacer 3, the invention is not limited thereto For example, one opto-electronic hybrid circuit board may be notched by a slicer or the like to form a micro-slit. Incidentally, in this case, the interface between a reference surface of the micro-slit and the microprism may be preferably filled with a photo-curable resin for performing refractive index matching to prevent scattered light from being caused by slicer cutting.

The constituent optical members of the optical connection device according to the invention, such as a prism and lenses, are all tiny optical elements and can be compactly and densely mounted. For this reasons the optical connection device can be formed as an optical connection device for opto-electronic hybrid circuit board, having a high constituent degree of freedom.

Because the optical connection device according to the invention uses a turning optical system composed of an optical waveguide array and a prism (or a mirror), the alignment of the optical waveguide array with the light source unit can be achieved merely by adjustment of the positions of the optical waveguide array and the light source unit on the opto-electronic hybrid circuit board. Accordingly, a mounting device can be simplified, and the optical connection device can be mounted and fixed at an arbitrary position in a surface of the opto-electronic hybrid circuit board.

Because the opto-electronic hybrid circuit board having a built-in turning optical unit and the light source unit are separate and independent, a removable/rebondable material such as a silicone resin may be used as the bonding material 19 for bonding the opto-electronic hybrid circuit board and the light source unit so that signals in the optical waveguides can be inspected with the light source unit removed for the purposes of: exchanging the light source unit (or the photo detector unit) for the sake of functional improvement; repairing the failed opto-electronic hybrid circuit board; and checking a failed place on the opto-electronic hybrid circuit board.

In order to prevent light beams emitted from the surface emission lasers from being reflected by the end surface of the opto-electronic hybrid circuit board 10a and returning to the same optical path, there has been taken a countermeasure of inclining the end surface of the opto-electronic hybrid circuit board 10a to the optical axes of the optical waveguides. Alternatively, the surface emission laser array 15 may be mounted so that the position of the surface emission laser array 15 is shifted by the same width as the active region of each surface emission laser from the optical axis of a corresponding microlens.

[Embodiment 2]

A second embodiment of the optical connection device according to the invention is functionally identical to Embodiment 1. In Embodiment 1, an optical waveguide array having a turning optical unit was integrated with a light source unit or with a photo detector unit, and the two units were brought into a facing contact with each other on a plane for adjustment to thereby be aligned with each other. This embodiment differs from Embodiment 1 in that the light source unit or photo detector unit and the turning optical unit are aligned and integrated into one body in advance, and after that the integrated body is fitted and fixed into the optical waveguides for connection.

Referring to FIG. 2, this embodiment will be described below. FIG. 2 is a sectional view taken in a direction parallel to the optical axes of the optical waveguides.

A microprism 23 is first stuck to a surface of a microlens array substrate 22 where a microlens array 27 is formed. A substrate loaded with a surface emission laser array 25 is surface-mounted directly onto a surface of the microlens array substrate 22 opposite to the microlens array 27. The position of the substrate is aligned and determined in the following manner.

First, light beams are emitted from the surface emission lasers and condensed on a surface (inclined surface) of the microprism 23 by the microlens array 27 (the thickness of the microlens array substrate 22 is determined on the basis of the focal length of each microlens). At this time, the substrate of the surface emission laser array 25 is moved on the surface of the microlens array substrate 22 to adjust the position of the substrate of the surface emission layer array 25 so that a group of condensed light spots come to specified positions respectively on the microprism surface. The specified positions are positions where the respective optical axes of the optical waveguides in the optical waveguide array 21a intersect with the microprism surface (inclined surface) when the microprism 23 is inserted into the micro-slit 24 while butting a reference surface in the micro-slit 24.

Incidentally, a glass microlens array produced on a glass substrate with a thickness of approximately 550 $\mu$m by an ion exchange method is used as the microlens array 27. Each lens is set to have a diameter of 120 $\mu$m and a focal length of 290 $\mu$m. The microprism 23 is identical to that used in Embodiment 1.

Although this embodiment has been described on the case where a surface emission laser array is used, the invention can be also applied to the case where a photodiode array is used in the same way as Embodiment 1. In this case, it may be however necessary to separately prepare alignment light sources and input light into the photodiode array at specified positions for the sake of alignment. It is however possible to enlarge the area of the photodetecting surface of each photodiode device to a certain extent. Accordingly, light need not be actually input into the photodiode array for the sake of alignment, and alignment can be adequately conducted by mechanical positioning. In this case, it is preferable to make the tolerance of positional displacement as large as possible by using microlenses of large numerical aperture.

The light source unit with which the turning optical path is integrated as configured in this manner, that is, the unit obtained by integration of the substrate loaded with the surface emission lasers, the microlens array substrate and the microprism, is inserted into the micro-slit 24 of the opto-electronic hybrid circuit board 20.

At this time, while an end surface of the prism is pressed against an end surface P3 of the opto-electronic hybrid circuit board 20, the apex of the prism is made to butt a bottom surface P4 of the micro-slit 24 to thereby position the integrated unit. Finally, the integrated unit is fixed by fine adjustment in the direction of arrangement of the surface emission laser array.

Although FIG. 2 shows the case where a notch formed in the opto-electronic hybrid circuit board is used as the micro-slit 24, this embodiment can be also applied to the case where two boards are stuck to each other by a spacer 3 as shown in FIGS. 1A and 1B.

[Embodiment 3]

Figure 3A:
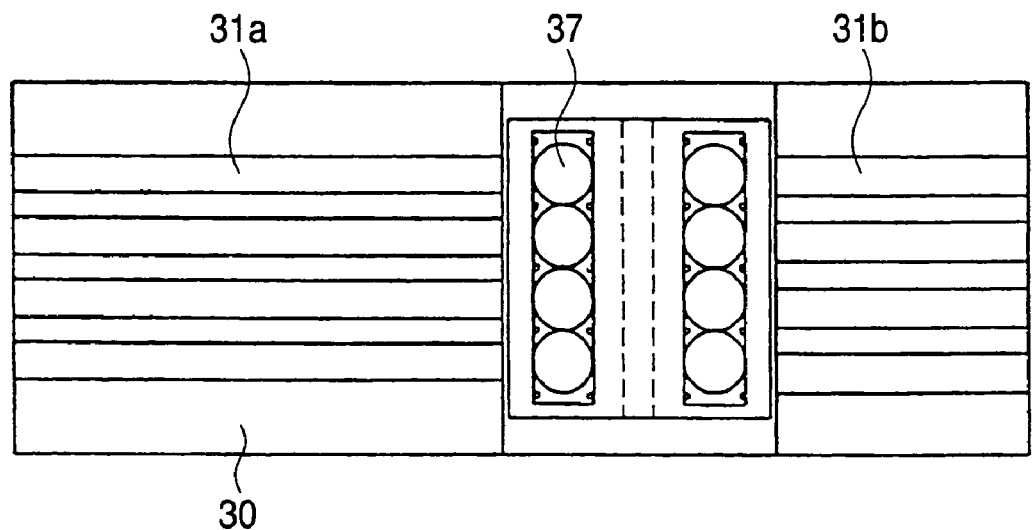
FIGS. 3A and 3B are typical views showing a third embodiment of the optical connection device according to the invention.
Figure 3B:
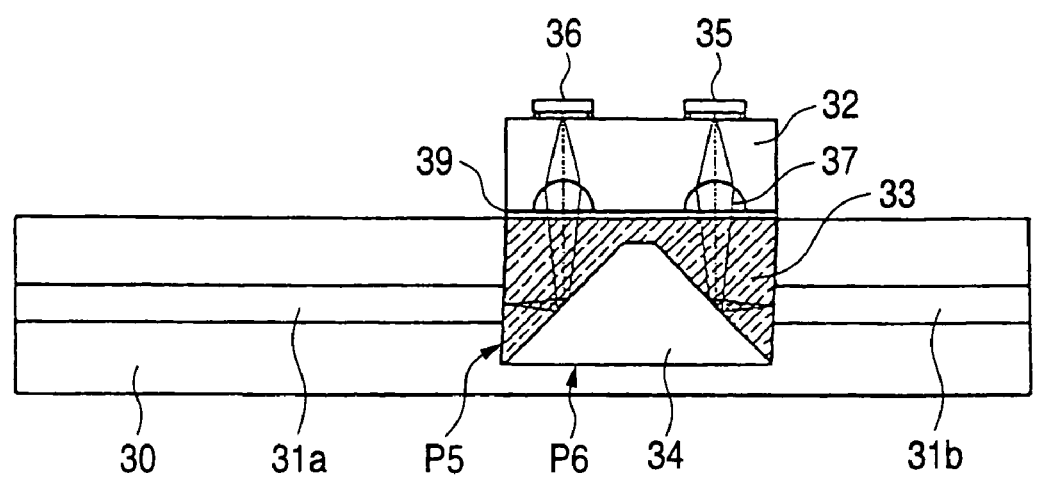

FIGS. 3A and 3B are views typically showing a third embodiment of the optical connection device according to the invention. The function of the optical connection device according to this embodiment is as follows. A plurality of optical signals input from an optical waveguide array 31a are received by a plurality of photodetecting elements such as a photodiode array 36 and converted into electronic signals respectively. On the other hand, light beams emitted from a plurality of light sources such as a surface emission laser array 35 are coupled to an optical waveguide array 31b. The optical connection device according to this embodiment integrally formed from these arrays 31a, 31b, 35 and 36. FIG. 3A is a top view of the optical connection device. FIG. 3B is a sectional view of the optical connection device taken in a direction parallel to optical axes.

This embodiment is the same as in Embodiment 1 or 2 in that the micro-slit 34 is formed in an opto-electronic hybrid circuit board 30 having a built-in optical waveguide array. However, the width of the micro-slit 34 is set at 3 mm.

Each of the photodiode array 36 and the surface emission laser array 35 is arranged at regular intervals of a pitch equal to the pitch of arrangement of the optical waveguides in the optical waveguide arrays 31a and 31b and is produced on one substrate. Similarly, two rows of microlenses 37 are formed in a microlens array substrate 32 so that microlenses 37 in each row are arranged at regular intervals of a pitch equal to the pitch of arrangement of the optical waveguides.

A microprism 33 having a sectional shape as shown in FIG. 3B is stuck to a microlens 37-forming surface of the microlens array substrate 32. This type of specially shaped microprism is suited to manufacture by molding. Next, the substrate loaded with the surface emission laser array 35 and the substrate loaded with the photodiode array 36 are surface-mounted on a surface of the microlens array substrate 32 opposite to the microlens-forming surface. The mounting positions are determined by respective alignment basically in the same way as Embodiment 2.

In this embodiment, a glass microlens array produced on a glass substrate with a thickness of approximately 550 $\mu$m by an ion exchange method is used as the microlens array 37. The dimensions of each lens are the same as those in Embodiment 2. Each lens is set to have a diameter of 120 $\mu$m and a focal length of 290 $\mu$m. The microprism 33 is set to have a size of 4×3 mm and a height of 2.1 mm.

The light input unit with turning optical paths configured in this manner, that is, the unit obtained by integration of the respective substrates loaded with the surface emission laser array 35 and the photodiode array 36, the microlens array substrate 32 and the microprism 33, is made to butt reference planes P5 and P6 in the micro-slit 34 of the opto-electronic hybrid circuit board 30 and fixed while finely adjusted so as to agree with the position of the optical waveguide array 31a.

The optical connection device according to this embodiment can be applied for the following purpose. Optical signals propagated through the optical waveguides are detected by the photodiodes and converted into electric signals respectively. For example, the electric signals are subjected to a shaping process or an arithmetic process based on other signals. Then, the electric signals are generated as signals for driving the surface emission lasers. Light beams emitted from the surface emission lasers driven by the drive signals are coupled to the optical waveguides so as to be propagated in the optical waveguides. The process for the electric signal parts can be conducted by electronic circuits mounted on the opto-electronic hybrid circuit board.

Accordingly, it is possible to integrate an optical connection device for conducting parallel processing while converting optical signals into electric signals and further converting the electric signals into optical signals.

As described above in Embodiment 2, the alignment of the surface emission laser side has to be conducted strictly but the alignment of the photodiode side may be conducted roughly because the photodetecting area on the photodiode side is large.

The use of light-emitting elements or photodetecting elements and microlenses as well as a turning optical unit permits the provision of an optical connection device for coupling optical waveguides and light-emitting/photodetecting elements to one another with a high degree of freedom.

What is claimed is:

1. An optical connection device for optically coupling at least one optical waveguide in which light propagates to at least one optical element disposed outside the optical waveguide, the optical connection device comprising:
    the optical waveguide provided in a board so that an optical axis thereof is parallel with a board surface, a part of the optical waveguide being removed so as to form a groove along a plane angled at a predetermined angle to the optical axis of the optical waveguide;
    the optical element opposing the groove of the optical waveguide so that an optical axis of the optical element intersects with the optical axis of the optical waveguide; and
    an optical unit arranged at a position of intersection of the optical axes of the optical element and the waveguide for turning light by reflection from one of the optical axes of the waveguide and the optical element along the other of the optical axes; wherein the optical unit is fitted to the groove such that a surface of the optical unit is guided by a surface of the groove.

2. An optical connection device according to claim 1, wherein the optical element is mounted on a surface which is parallel with the board surface at a predetermined distance apart therefrom.

3. An optical connection device according to claim 2, further comprising a light-condensing unit interposed between the optical element and the optical unit for turning light.

4. An optical connection device according to claim 1, wherein the optical element is a light-emitting element.

5. An optical connection device according to claim 4, further comprising a light-condensing unit interposed between the optical element and the optical unit for turning light.

6. An optical connection device according to claim 1, wherein the optical element is a photodetecting element.

7. An optical connection device according to claim 6, further comprising a light-condensing unit interposed between the optical element and the optical unit for turning light.

8. An optical connection device according to claim 1, wherein the optical unit for turning light is either of a prism and a mirror.

9. An optical connection device according to claim 8, further comprising a light-condensing unit interposed between the optical element and the optical unit for turning light.

10. An optical connection device according to claim 1, wherein the optical element and the optical unit for turning light are integrated into a single body so as to be aligned to each other, and the single body is fitted into the groove, thereby coupling the optical element to the optical waveguide.

11. An optical connection device according to claim 10, further comprising a light-condensing unit interposed between the optical element and the optical unit for turning light.

12. An optical connection device according to claim 1, wherein a plurality of the optical waveguides are coupled to a plurality of the optical elements forming an optical element array, and
the optical element array is mounted on a surface which is parallel with the board surface at a predetermined distance apart therefrom.

13. An optical connection device according to claim 12, further comprising light-condensing units forming a light-condensing units array, each of which is interposed between the corresponding one of the optical elements and the optical unit for turning light.

14. An optical connection device according to claim 1, further comprising a light-condensing unit interposed between the optical element and the optical unit for turning light.

15. The optical connection device according to claim 1, wherein the optical unit is a prism and the prism agrees with the shape of the groove.

16. An optical connection device comprising:
a board;
first and second optical waveguides formed in the board so that optical axes of the first and second waveguides are parallel to a surface of the board respectively;
each of the first and second optical waveguides having an end surface exposed to a common groove portion angled at a predetermined angle to the optical axes of the first and second optical waveguides respectively;
a photodetecting element disposed outside the first optical waveguide;
a light emitting element disposed outside the second optical waveguide; and
an optical unit disposed in the common groove portion for turning light output from the first optical waveguide to the photodetecting element and for turning light emitted from the light-emitting element to the second optical waveguide,
wherein a first optical signal propagated through a first optical waveguide is input into the photodetecting element,
the optical signal is converted into an electric signal, and a predetermined transformation is applied to the electric signal,
the light-emitting element is driven according to the electric signal after the transformation, and
light emitted from the light-emitting element is coupled to a second optical waveguide as a second optical signal.

17. An optical connection device according to claim 16, wherein the photodetecting element and the light-emitting element are mounted on a surface which is parallel with the board surface at a predetermined distance apart therefrom.

18. An optical connection device according to claim 12, further comprising a light-condensing unit interposed at least between the light-emitting element and the optical unit.

19. An optical connection device according to claim 16, wherein the optical unit for turning light is a polymorphic prism.

20. An optical connection device according to claim 19, further comprising a light-condensing unit interposed at least between the light-emitting element and the optical unit.

21. An optical connection device according to claim 16, wherein at least one of the photodetecting element and the light emitting element and the optical unit for turning light are integrated into a single body so as to be aligned to each other, and the single body is fitted into the common groove portion, thereby coupling the at least one of the photodetecting element and the light emitting element to the corresponding one of the first and second optical waveguides.

22. An optical connection device according to claim 21, further comprising a light-condensing unit interposed at least between the light-emitting element and the optical unit.

23. An optical connection device according to claim 16, further comprising a light-condensing unit interposed at least between the light-emitting element and the optical unit for turning light.

* * * * *